Figure 1:
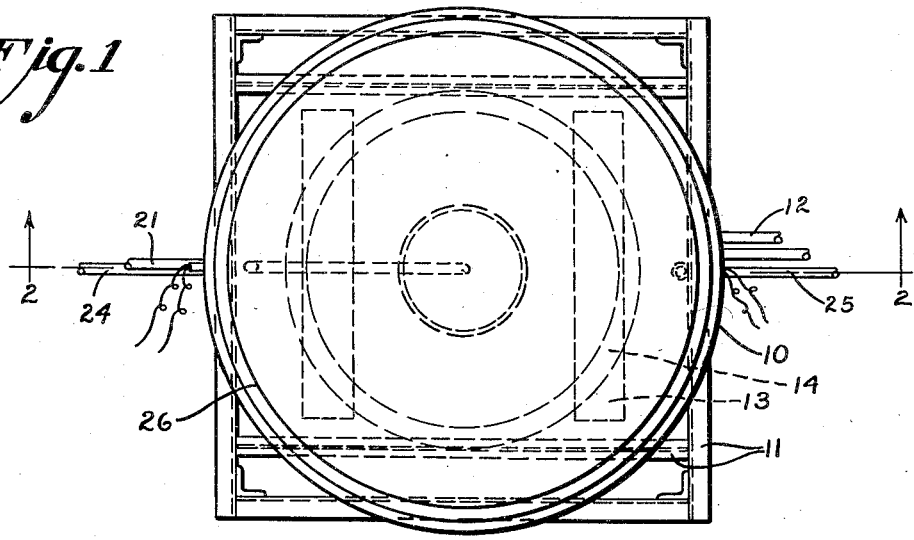

April 28, 1936.  A. E. BADGER  2,038,627

METHOD OF MAKING GLASS

Filed July 18, 1935

INVENTOR.
A. E. BADGER
BY
ATTORNEYS.

Patented Apr. 28, 1936

2,038,627

UNITED STATES PATENT OFFICE 2,038,627

METHOD OF MAKING GLASS

Alfred E. Badger, Urbana, Ill., assignor to Corning Glass Works, Corning, N. Y., a corporation of New York Application July 18, 1935, Serial No. 32,063

4 Claims. (Cl. 49—78.1)

This invention relates to glass and more particularly to the method of making glasses which fuse only at very high temperatures, such as silica glass.

The primary object of this invention is to make transparent silica glass which is substantially free from seeds and bubbles.

When ordinary glasses are melted in the usual manner in a refractory container, a large volume of gases is evolved as a result of the decomposition of the batch materials. These gases together with air, which was entrapped in the interstices between the batch particles, form bubbles of various sizes in the molten glass. Due to the fluidity of ordinary glasses, these bubbles and seeds rise slowly through the melt and escape from the surface of the glass.

However, when the attempt is made to melt silica, that is sand, quartz, or the like, in a similar manner, entirely different conditions are encountered. Silica glass never becomes fluid as do ordinary commercial glasses but remains pasty even at 2200° C., and such high temperatures result in considerable losses of silica by volatilization. The bubbles, which in this case consist mostly of entrapped air, will not rise through the viscous mass. The use of vacuum during melting for the preliminary removal of interstitial air followed by the application of pressure to contract any remaining seeds and cause them to disappear results in a transparent product, but the cost of production is great.

I have discovered a cheap and efficient method of producing transparent silica glass or fused silica, which comprises replacing the air between the silica particles of the batch with helium gas, fusing the silica batch to a glass containing bubbles or seeds of helium and maintaining the fused mass at a sufficiently high temperature to permit the helium to diffuse through the glass and escape.

The rates at which various gases diffuse through silica glass have been measured by several investigators. These rates of diffusion are negligible in most cases. The two gases, helium and hydrogen, are exceptional in that they possess relatively great diffusion rates. It has been found that these rates increase rapidly with rise in temperature. Furthermore, helium diffuses much more readily than does hydrogen. For example, the volume of helium diffusing through silica glass at 500° C. was found to be twenty-two times that of hydrogen. Since the helium molecule is the smallest molecule, its passage through the network of silica glass or any silicate glass would be favored.

The diffusion rates of helium and hydrogen through silica glass have been measured up to about 900° C. and considerable resistance is offered to the passage of these gases even at this temperature. For example, a plate of silica 1 mm. thick and 1 sq. cm. in area would permit only 0.1 cc. of helium to pass through it per hour, the pressure of helium being one atmosphere. Assuming that the rate at which diffusion increases with increase of temperature up to 900° C. would continue up to 2000° C. or above, then the volume of gas, calculated to standard conditions, which would pass through the above silica plate at 2000° C. would be about 250 cc. Although this extrapolation is probably not strictly in accordance with fact, it affords a rough estimate of the diffusion at this high temperature, which is sufficiently great to permit the manufacture of transparent silica by my improved method.

Figure 2:
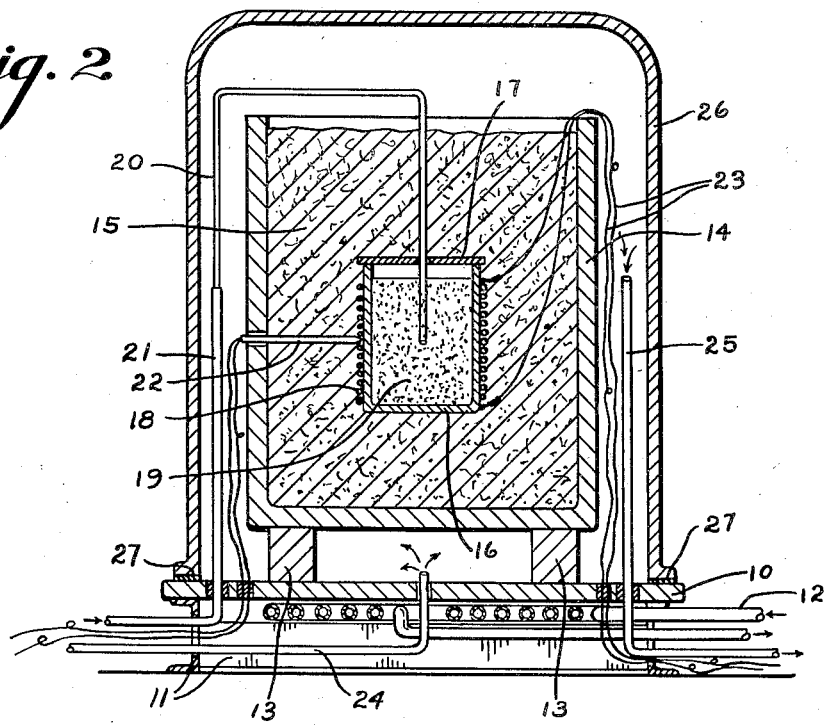

In order that my invention may more readily be understood, reference is had to the accompanying drawing which illustrates one embodiment of my invention and in which:

Fig. 1 is a plan view of a simple apparatus for making silica glass in accordance with my invention; and Fig. 2 is a vertical sectional view on the line 2—2 of Fig. 1.

In the drawing, which represents a molybdenum wound resistance furnace charged with a batch and ready for operation, a metal base plate 10 which is mounted on suitable supports 11 is provided with cooling means such as a coiled tube 12 through which water or other cooling fluid may be passed. Upon the base plate 10 and raised therefrom by refractory blocks 13 is placed a refractory container 14 in which is disposed a quantity of powdered insulating material 15 of high refractoriness such as zirconium oxide. Located within the insulating material 15 and surrounded on all sides thereby is a melting container 16 which is composed of zirconia, thoria, or other super-refractory substance, and which is provided with a cover 17, having a hole, and an electrical heating element 18 which is preferably of molybdenum. Within the melting container 16 is placed a batch 19 to be melted comprising silica sand, pulverized quartz or other form of silica. A silica tube 20, the open end of which is immersed in the batch, extends upwardly through the hole in the cover 17 and above the top of the side of the container 14 over which it is bent so as to extend downwardly and join with an auxiliary tube 21 which is sealed through the base plate 10 with wax or other suitable means. A thermocouple 22, having its hot junction adjacent the melting container 16 is carried through the side wall of the container 14 and extends downwardly through the base plate 10 from which it is insulated by a gas tight seal of wax. In a similar manner a pair of copper lead-in wires 23 is sealed through the base plate 10 and extend upwardly and over the edge of the container 14 to join with the ends of the heating element 18. Inlet and outlet tubes 24 and 25 respectively are also sealed through the base plate 10. A bell jar 26, which preferably is composed of metal such as iron but may be composed of any heat resisting gas tight material such as glass, rests upon the extremities of the base plate 10 to which it is sealed with a wax seal 27 and serves to exclude air from the assembled furnace and its contents and to maintain within it the special atmosphere which is necessary for successful operation.

In practicing my invention, the apparatus having been assembled as illustrated and described above, a gentle stream of helium is passed through the tubes 21 and 20 from a suitable source, not shown, in order to sweep the interstitial air from the batch 19 and replace it with helium. At the same time a slow stream of hydrogen is passed through the inlet tube 24 from a suitable source, not shown, in order to sweep the air from within the bell jar 26 out through the outlet tube 25 and maintain within the apparatus an atmosphere of hydrogen in the manner customary for the operation of molybdenum wound furnaces. When the above recited conditions are attained an electric current is applied to the lead-in wires 23 so as to heat the molybdenum element 18 and fuse the batch 19. When the batch fuses, the portion of the tube 20 which is immersed therein will likewise fuse and the tube will be severed above the glass line. The incoming stream of helium may be either continued or discontinued, or it may be replaced by a stream of any other gas which is inactive toward molten silica and highly heated molybdenum. The fused charge of silica containing bubbles of helium is then maintained in the molten condition until the helium in the bubbles has diffused through the viscous mass and escaped leaving the melt substantially free from bubbles. During the diffusing step it is preferable to discontinue the passage of helium through the tube 21, both on account of economy and also because diffusion from the bubbles takes place more rapidly if a low partial pressure of helium is maintained in the atmosphere surrounding the melt. The temperature of the molten mass may readily be ascertained for ease of control by means of the thermocouple 22 which is used in the customary manner in conjunction with a potentiometer or galvanometer, not shown.

After being melted and fined as described above, the transparent silica glass may be removed from the melting container and be reheated and molded or drawn in the manner known in the art of fabricating articles of silica glass.

While in the above specification I have disclosed my invention as applied to the clearing of glass resulting from the fusion of substantially pure silica, it is also applicable to the clarification of other glasses which are permeable to helium when heated and hence in the following claims I will use the term "glass" as a generic expression including silica glass or fused silica.

What I claim is:

1. The method of making glass which is substantially free from bubbles which includes fusing the batch therefor in the presence of helium so that the bubbles which remain in the fused glass and which would normally contain air and other gases, will instead contain substantially pure helium and maintaining the glass in fused condition until the helium has diffused out of the bubbles.

2. The method of making transparent silica glass, which includes replacing the interstitial air in the batch with helium, fusing the batch to produce a molten mass of silica having bubbles which contain helium and maintaining the silica at high temperature until the helium has diffused from the bubbles.

3. The method of making transparent silica glass, which includes passing helium through the batch to replace the interstitial air therein, fusing the batch to produce a molten mass of silica having bubbles which contain helium and maintaining the silica at high temperature in an atmosphere which is substantially free from helium until the helium has diffused from the bubbles.

4. The method of making transparent silica glass, which includes passing helium through the batch to replace the interstitial air therein, fusing the batch to produce a molten mass of silica having bubbles which contain helium and maintaining the silica at high temperature in an atmosphere of hydrogen which is substantially free from helium until the helium has diffused from the bubbles.

A. E. BADGER.